United States Patent [19]

Schierling et al.

[11] Patent Number: 5,624,317
[45] Date of Patent: Apr. 29, 1997

[54] FRICTION BEARING FOR A FLYWHEEL WITH TWO CENTRIFUGAL MASSES AND GUIDING ARRANGEMENT FOR SPRINGS ASSOCIATED THEREWITH

[75] Inventors: Bernhard Schierling, Kürnach; Reinhard Feldhaus, Ebenhausen, both of Germany

[73] Assignee: Fichtel & Sachs AG, Schweinfurt, Germany

[21] Appl. No.: 182,582

[22] Filed: Jan. 18, 1994

[30] Foreign Application Priority Data

Jan. 20, 1993 [DE] Germany .................. 43 01 311.2

[51] Int. Cl.⁶ .................. F16D 3/14; F16F 15/12
[52] U.S. Cl. .................................................. 464/68
[58] Field of Search .................. 464/24, 66, 68

[56] References Cited

U.S. PATENT DOCUMENTS

| | | | |
|---|---|---|---|
| 2,909,911 | 10/1959 | Spaetgens | 464/66 |
| 4,484,898 | 11/1984 | Kohno | 464/68 X |
| 4,601,676 | 7/1986 | Tojima et al. | 464/68 X |
| 4,635,780 | 1/1987 | Wiggen | 464/68 X |
| 5,052,978 | 10/1991 | Hanke | 464/24 |

FOREIGN PATENT DOCUMENTS

| | | | |
|---|---|---|---|
| 0421965 | 4/1991 | European Pat. Off. | |
| 3815505 | 12/1988 | Germany. | |
| 0106246 | 6/1983 | Japan | 464/68 |
| 2113803 | 8/1983 | United Kingdom. | |
| 2219647 | 12/1989 | United Kingdom. | |

Primary Examiner—Daniel P. Stodola
Assistant Examiner—Emmanuel M. Marcelo
Attorney, Agent, or Firm—Nils H. Ljungman and Associates

[57] ABSTRACT

A device to damp vibrations in a motor vehicle between the engine and the drive train, whereby there is a torsion damping device between a first centrifugal mass and a second centrifugal mass. The torsion damping device contains coil springs which are guided in guide blocks and spring cups. A bearing for the second centrifugal mass is provided on the first centrifugal mass by way of a friction bearing in the radially inner area of the spring cups and guide shoes.

12 Claims, 4 Drawing Sheets

FRICTION BEARING FOR A FLYWHEEL WITH TWO CENTRIFUGAL MASSES AND GUIDING ARRANGEMENT FOR SPRINGS ASSOCIATED THEREWITH

BACKGROUND OF THE INVENTION

1. Field of the Invention

The present invention generally relates to a device to damp vibrations in a motor vehicle between the engine and the drive train, with a first centrifugal mass and a second centrifugal mass, wherein the first centrifugal mass is fastened to a crankshaft and the second centrifugal mass is equipped with a start-up and shifting clutch, the second centrifugal mass being mounted so that it can rotate coaxially with the first centrifugal mass, with a common axis of rotation. Further included is a torsion damping device between the two centrifugal masses which includes at least a first spring stage with a large angle of rotation, whereby the corresponding coil springs are guided on a common mean diameter in a channel of the first centrifugal mass. The channel can be filled at least partly with a viscous material, e.g. a lubricant, and the springs are actuated by means of spring cups.

2. Background Information

A device such as that described above is disclosed, for example, in German Laid Open Patent Appln. No. 3 815 505. On the flywheel with two centrifugal masses disclosed therein, the second centrifugal mass is guided in relation to the first centrifugal mass by means of a roller bearing, and can rotate relative to the first centrifugal mass. The roller bearings required for this purpose have a large diameter and are therefore relatively expensive. Moreover, as a result of their relative proximity to the friction surface of the starter and clutch, they must be protected against high temperature.

OBJECT OF THE INVENTION

The object of the present invention is to achieve the most economical bearing arrangement between the two centrifugal masses.

SUMMARY OF THE INVENTION

The invention teaches that the above object can be achieved wherein the spring stage with a large angle of rotation preferably includes several individual cylindrical coil springs which are connected in series, whereby between the facing ends of the coil springs there are guide shoes which are guided radially outward and in both axial directions by the inside walls of the aforementioned channel. Radially inside the coil springs, the guide shoes preferably form a circumferential internal contour located concentric to the axis of rotation, by means of which internal contour a friction bearing is provided for the second centrifugal mass so that the second centrifugal mass can rotate in the radial direction by means of a corresponding external contour.

As a result of the division of the spring stage with a large angle of rotation into several individual cylindrical coil springs which are connected in series, and between each two of which there are guide shoes which are guided radially outward and in both axial directions by the inside walls of the channel of the first flywheel, or centrifugal mass, it is possible, by means of an internal contour of the guide shoes, the circumference of which is concentric to the axis of rotation, to form a bearing point by means of which the second circumferential mass is provided with a friction bearing, or slide bearing, in the radial direction so that the second centrifugal mass can rotate by means of a suitable external contour. As a result of this configuration, according to the present invention, the expensive roller bearing can be replaced by a simple friction bearing, whereby the arrangement simultaneously saves space. The guide shoes which guide the springs thereby perform a dual function, namely supporting the springs and acting as bearings for the second centrifugal mass.

In accordance with an additional characterizing feature of the present invention, the guide shoes in the radially inner area of the buffer blocks have spring guidance extensions in both circumferential directions, which, radially inwardly, form the internal contour for the bearing arrangement for the second centrifugal mass. Thus, the guide shoes for the guidance of the springs can also be used to form a friction bearing for the second centrifugal mass.

When spring cups are used for each end spring of the respective spring set, it is also possible to equip the spring cups with spring guide extensions, which also have a corresponding internal contour, wherein the internal contour of the spring guide extensions can guide the second centrifugal mass together with the internal contour of the guide shoes. Thus, there is an internal contour which is almost uninterrupted along the circumference which, with a corresponding external contour of the second centrifugal mass, forms a mutual friction bearing point. Preferably, both the guide shoes and the spring cups are advantageously made of plastic so that, for example, a manufacturing process employing injection molding can be used. The components manufactured in this manner can be produced easily and economically. But the use of other materials cannot be ruled out, e.g. metal or compound solutions (steel plus plastic), if there are particular reasons for using them.

The external contour of the second centrifugal mass thereby extends at least along the circumference between the actuator elements for the spring cups. When there are three spring sets one after the other in the circumferential direction, there is a three-point bearing.

The external contour which represents the friction bearing and the actuator elements are thereby preferably formed by a disc-shaped component (hub). The hub preferably runs concentric to the axis of rotation. Actuator elements (fingers) of the hub preferably extend between the axial walls of the channel. The hub is preferably rigidly connected, in the vicinity of its inside diameter, to the second centrifugal mass. Thus, the drive-side part of the friction bearing can preferably be formed by a simple, disc-like component, which simultaneously guarantees the transmission of torque from the individual springs to the second centrifugal mass. This component can be manufactured separately and can be rigidly connected to the second centrifugal mass.

The external and internal contour can thereby be particularly compact, with a guide width which is essentially the same as the thickness of the disc-shaped component.

A particularly simple and compact guidance in both axial directions can be achieved if both the internal contour and the external contour have a larger diameter than the other areas of the spring guide extensions, so that a groove is formed in which the hub is guided radially and axially.

With regard to a lower surface pressure, however, it may also be advantageous to configure the internal contour essentially over the entire axial extent of the guide shoe or spring cup, and to have the hub axially braced directly against components of the first centrifugal mass. Thus a very large surface area is available for the friction bearing, the axial extent of which is at least as large as the diameter of the individual coil springs.

The axial support in the direction of the crankshaft can thereby advantageously be achieved radially inside the external contour on a radial inside wall of the first centrifugal mass, whereby if necessary, there can be a wearing ring made of appropriate material.

On a flywheel with two centrifugal masses on which, between the component of the first centrifugal mass, which forms the inside wall of the channel closer to the second centrifugal mass, and the disc-shaped component, there is preferably a seal system which comprises a spring which acts in the axial direction. The invention proposes that the axial localization in the direction of the first centrifugal mass is made via the spring plates of the seal system. The result is permanent lateral contact between the two centrifugal masses, which in connection with the corresponding material of the wearing ring, can be used to generate a defined friction.

To increase the surface area of the friction bearing beyond the thickness of the hub disc, the invention also teaches that, at least on the circumference of the hub disc between the actuator elements, there are preferably guide tabs which extend in an axial direction to form the external contour opposite the also-expanded internal contour of the guide shoes and spring cups. Naturally, it is also possible to locate the guide tabs in the vicinity of the actuator elements, but such a configuration is relatively expensive.

There is an additional possibility for a secure guidance and configuration of the friction bearing point if the guide tabs are located alternately, i.e. alternately in one axial direction and in the other axial direction when there are an even number of actual elements. That creates a particularly broad basis for the friction bearing point.

In a particularly advantageous configuration, the guide tabs are preferably located on the side facing the second centrifugal mass. In this arrangement the guide tabs, which have one end surface opposite the inner wall of the cover plate, can act as an axial guide. The hub and thus the second centrifugal mass would therefore necessarily be guided in both axial directions.

Improved guidance for the spring cups and the guide shoe can be achieved if, on the first centrifugal mass, there is a concentric circular guide ring surface bordering the channel radially inward, which guides the guide shoes and the spring cups radially, and extends essentially to the disc-shaped component. The spring cups and the guide shows are thereby subjected to a forced and particularly secure guidance both radially outward and inward.

The connection between the disc-shaped component and the second centrifugal mass is preferably made by means of rivets, whereby radially inside these rivets, there are lugs on the disc-shaped component which are torsionally engaged with a friction disc which has corresponding recesses, which friction disc is guided concentric to the axis of rotation on the first centrifugal mass, and is in frictional contact with the first centrifugal mass by means of a spring. In this manner it becomes possible, with practically no additional effort or expense, to control a friction device which—with or without clearance in the circumferential direction—can be used when there is relative rotation between the two centrifugal masses.

In summary, one aspect of the invention resides broadly in a torsional damping device for a motor vehicle clutch, which torsional damping device is for being connected between the motor vehicle clutch and a crankshaft, the device comprising: first flywheel means and second flywheel means; the first flywheel means and the second flywheel means having means for being mounted for movement with respect to one another about a common axis of rotation; the first flywheel means having means for being connected to the crankshaft and the second flywheel means having means for being connected to the motor vehicle clutch; the first flywheel means and the second flywheel means defining a circumferential direction about the common rotational axis; means for transmitting torque between the first flywheel means and the second flywheel means; means for damping torsional vibrations of the first flywheel means and the second flywheel means with respect to one another; and the damping means comprising: spring means for damping the torsional vibrations of the first flywheel means and the second flywheel means with respect to one another; means for connecting the spring means with the first flywheel means; means for connecting the spring means with the second flywheel means; the spring means comprising at least one set of a plurality of springs; each of the at least one set of a plurality of springs extending over a substantial angle about the common axis of rotation; and within each of the at least one set of a plurality of springs, the springs being connected in series with one another in the circumferential direction of the first flywheel means and the second flywheel means.

Another feature of the invention resides broadly in a torsional damping device for a motor vehicle clutch, which torsional damping device is for being connected between the motor vehicle clutch and a crankshaft, the device comprising: first flywheel means and second flywheel means; the first flywheel means and the second flywheel means having means for being mounted for movement with respect to one another about a common axis of rotation; the first flywheel means having means for being connected to the crankshaft and the second flywheel means having means for being connected to the motor vehicle clutch; the first flywheel means and the second flywheel means defining a circumferential direction about the common rotational axis; means for transmitting torque between the first flywheel means and the second flywheel means; means for damping torsional vibrations of the first flywheel means and the second flywheel means with respect to one another; the damping means comprising spring means for damping the torsional vibrations of the first flywheel means and the second flywheel means with respect to one another; and slide bearing means for slidingly supporting a portion of the first flywheel means and a portion of the second flywheel means with respect to one another to permit rotation of the first flywheel means and the second flywheel means with respect to one another.

BRIEF DESCRIPTION OF THE DRAWINGS

The invention is explained in greater detail below with reference to the embodiments illustrated in the accompanying drawings, wherein.

DESCRIPTION OF THE PREFERRED EMBODIMENTS

Figure 1:
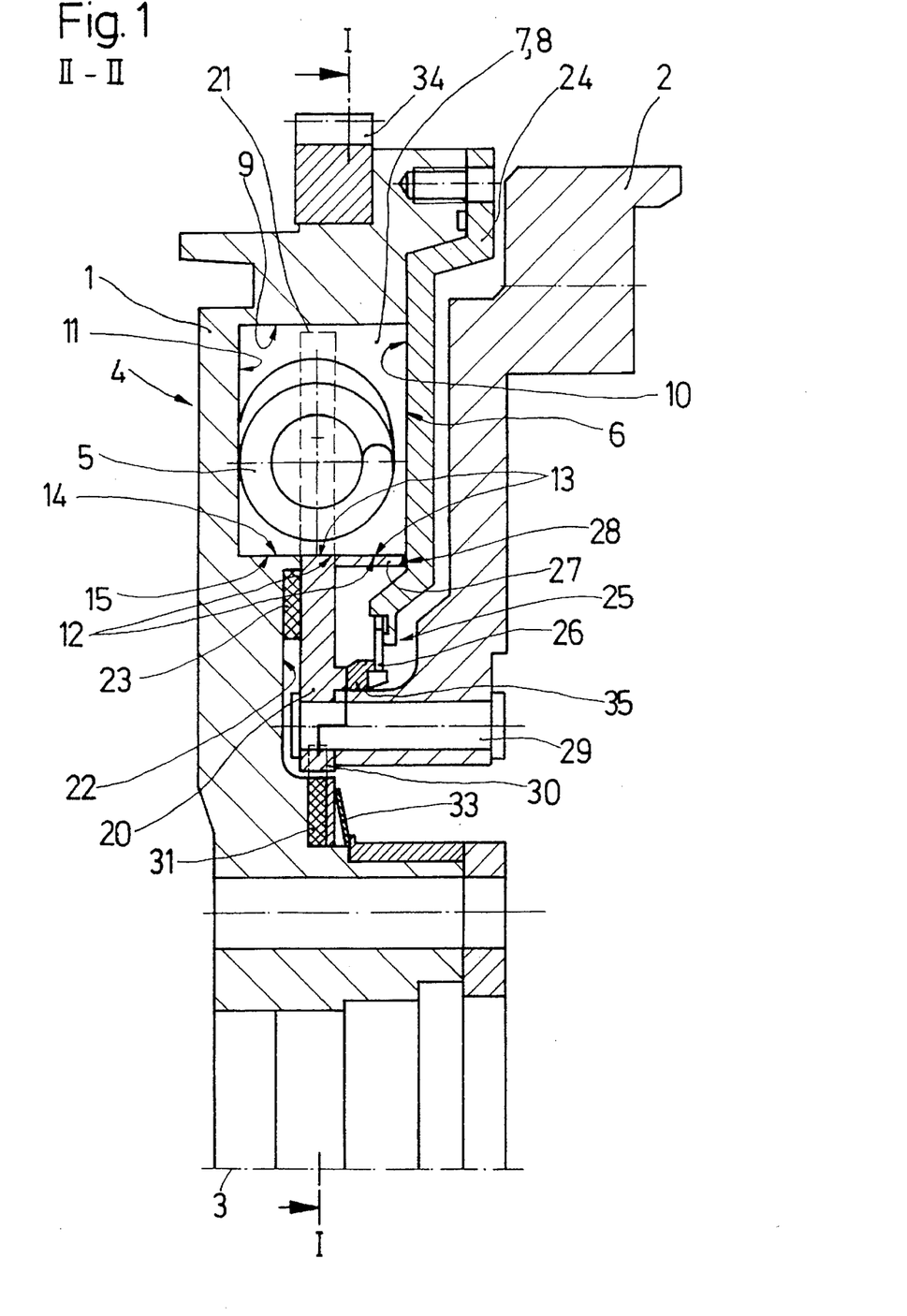
FIG. 1 shows the upper half of the longitudinal section through a flywheel which has two centrifugal masses.
Figure 2:
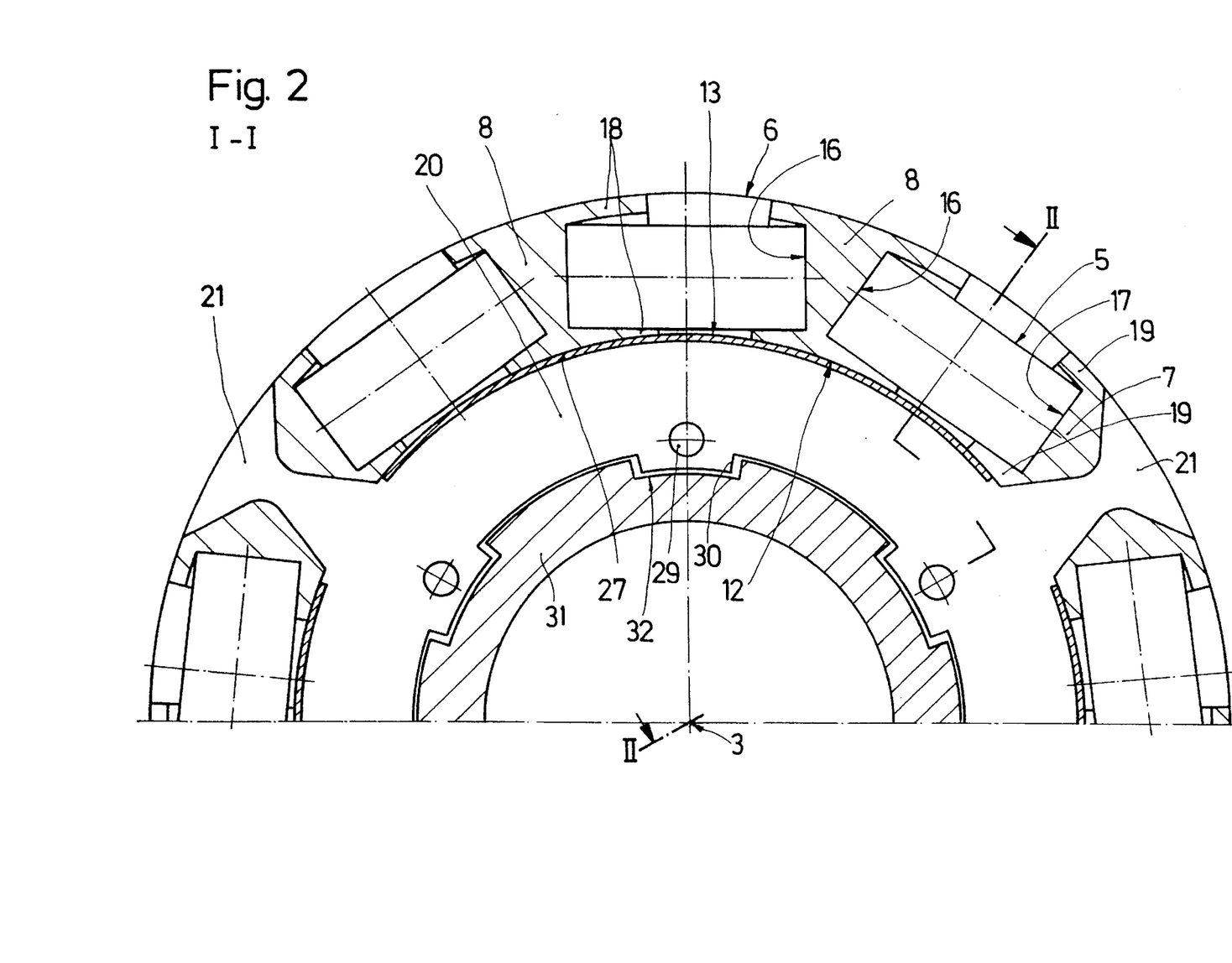
FIG. 2 shows a cross section along Line I—I in FIG. 1.

FIGS. 1 and 2 show, respectively, a partial longitudinal section and a partial cross section of a flywheel which has two centrifugal masses, with a first centrifugal mass 1 which is rigidly connected to a crankshaft (not shown) of an internal combustion engine, and a second centrifugal mass 2 which is mounted so that it can rotate essentially on, and with respect to, the first centrifugal mass 1, and which is connected to a friction clutch (also not shown) by conventional means. Essentially all the parts of the flywheel with two centrifugal masses are oriented concentric to the axis of rotation 3 and can rotate around this axis of rotation 3.

The first centrifugal mass 1, together with a cover plate 24, preferably forms a circular channel which runs concentric to the axis of rotation 3, and in which there are preferably several coil springs 5, each being oriented approximately tangential to the axis of rotation 3 and which are part of a torsion damping device 4 which acts between the two centrifugal masses 1 and 2. This torsion damping device 4 preferably includes several sets of coil springs 5 which act in series.

As illustrated by way of an example in FIG. 2, there can preferably be three sets of coil springs 5, whereby each set can preferably include three coil springs, each of the three coil springs being connected in series. The coil springs 5 are thereby located in a channel which is preferably formed in the first centrifugal mass 1, and is preferably bounded by the inside wall 9 as the radial outer limit and the two axial inside walls 10 and 11, whereby the inside wall 11 is preferably formed directly by the first centrifugal mass 1 and the inside wall 10 is preferably formed by the cover plate 24. The cover plate 24 is preferably connected rigidly and in a sealed manner to the first centrifugal mass, or flywheel 1. The sealed connection is essentially necessary because the channel 6 can preferably be at least partly filled with a lubricant or a damping medium.

Preferably extending from a radially inward area into this channel 6 is the hub 20, which, in the illustrated embodiment, preferably has three fingers 21 which project radially outward and are distributed over the circumference so as to actuate the coil springs 5. The coil springs 5 are also preferably actuated by stops (not shown in any greater detail in FIGS. 1 and 2) inside the channel 6, which in turn are preferably rigidly connected to the first centrifugal mass 1.

On the circumference, between the individual coil springs 5, there are preferably guide shoes 8 which have buffer blocks 16 to support the end surfaces of the coil springs 5. These guide shoes 8 are preferably guided in the channel 6, namely both on the inside wall 9 in a radially outward direction, and on the inside walls 10 and 11 in both axial directions. The end springs of each set of coil springs 5 are preferably guided in spring cups 7 which also have buffer blocks 17. These spring cups 7 can preferably be actuable both by the fingers 21 of the hub 20 and by the stops (not shown) on the first centrifugal mass 1.

Both the spring cups 7 and the guide shoes 8 preferably have spring guide extensions 19 and 18 respectively, so that the coil springs 5 can be guided radially outward and radially inward in the guide shoes and spring cups. The spring cups 7 and the guide shoes 8, in their radially inner area, preferably have an internal contour 12 against which the hub 20 is braced with an appropriate, matching external contour 13 which preferably acts as a bearing for the second centrifugal mass 2 which is rigidly connected to the hub 20. Between the external contour 13 of the hub 20 and the internal contour 12 of the spring cups 7 and guide shoes 8 there is thus effectively a friction bearing point, or areas, which extends circumferentially over a large angular range and is formed by components which are already present. Thus, in the embodiment illustrated in FIG. 2, there can preferably be a three-point bearing, since there are three friction bearing areas on the circumference between the individual fingers 21 of the hub 20. It is naturally possible to realize two-point or four-point bearings, as a function of the number of spring sets.

The hub 20 is preferably rigidly connected, radially inside the channel 6, to the second centrifugal mass 2 by means of rivets 29. Between the radially inside area of the cover plate 24 and the hub 20, there is preferably a seal system 25 which includes both an axially prestressed spring plate 26 and a seal element 35. The prestress of the spring plate 26 can also preferably be used to fix the hub 20 together with the second centrifugal mass 2 in the axial direction on the first centrifugal mass 1. For this purpose, between the hub 20 and a radial inside wall 22 of the first centrifugal mass 1, there is preferably a stop surface which is formed, for example, by the interposition of a wearing ring 23. The wearing ring 23 can thereby preferably be made of a material which has suitable friction characteristics, and together with the prestress of the spring plate 26 can be used to generate a specified friction force.

The axial localization in the opposite direction can thereby be provided by an end surface 28 of guide tabs 27 which are attached to the hub 20, whereby the end surface 28 is opposite the inside wall 10 of the cover plate 24. Thus there is essentially an axial localization in both directions. The guide tabs 27, which can be manufactured, for example, by axial extensions displaced from the material of the hub 20, enlarge the external contour 13 opposite the internal contour 12 of the spring cups 7 and of the guide shoes 8, so that at these locations, the friction bearing point is distributed over a larger area. When there are an even number of spring sets, the guide tabs 27 can preferably be located alternately in one axial direction and in the other axial direction.

As shown in FIG. 1, in the first centrifugal mass 1, matching the external contour 13, there is preferably a cylindrical, circular guide surface 14, which is located on the side of the hub 20 facing the crankshaft. On this guide surface 14, the spring cups 7 and the guide shoes 8 with their internal contour 15 can also be guided inwardly in the radial direction. The hub 20 also extends radially inward, beyond the area in which it is fastened to the second centrifugal mass 2, by means of lugs 30 which are engaged in corresponding recesses 32 of a friction disk 31 which is in contact with a surface of the first centrifugal mass 1 under the prestress of a spring 33. Thus a friction device is formed which is used when there is a relative rotation between the two centrifugal masses 1 and 2, and, if necessary, with corresponding clearance angles.

Figure 1A:
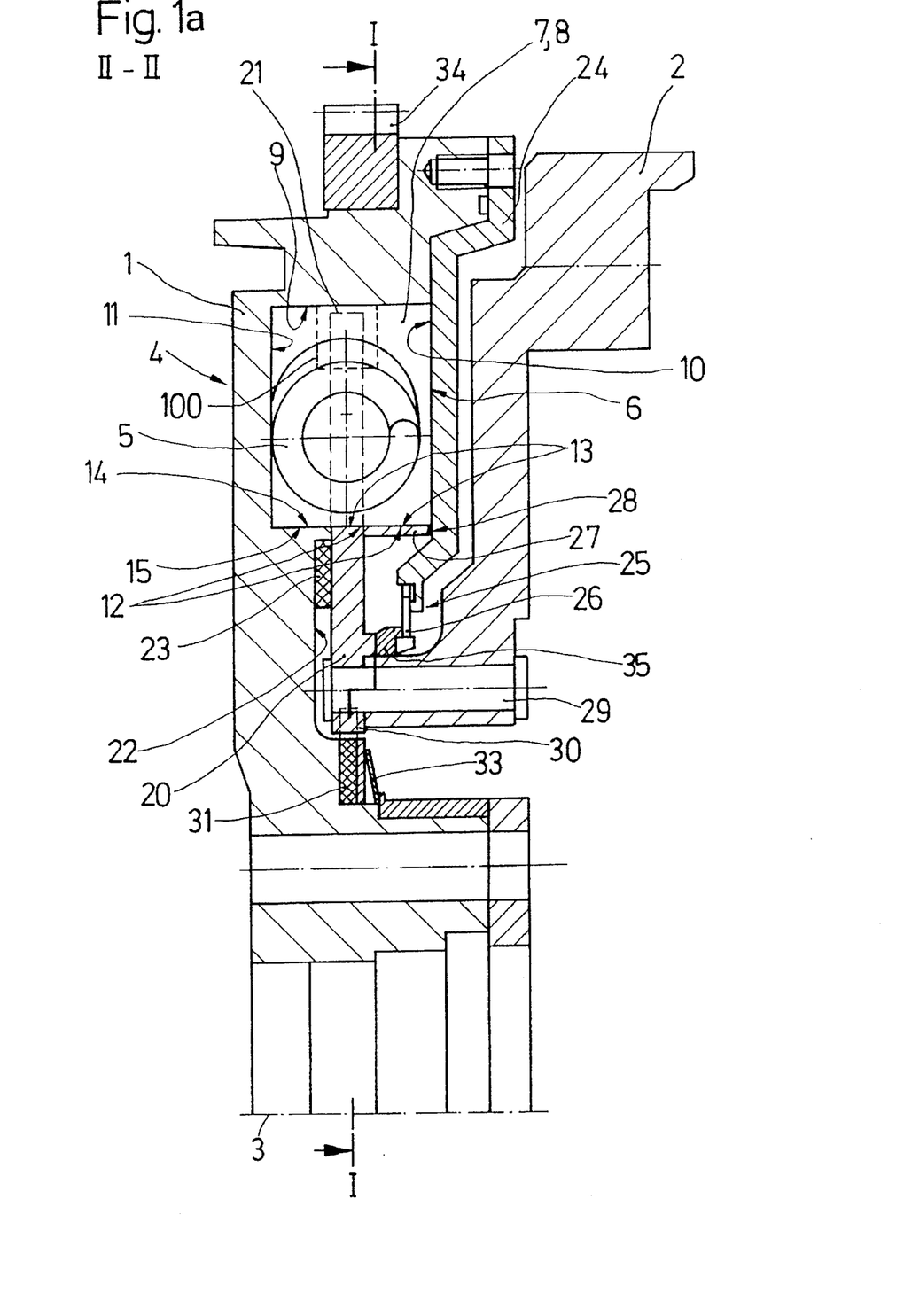
FIG. 1a is substantially the same view as FIG. 1, but illustrating an additional component.

FIG. 1a illustrates the stops mentioned above, indicated at 100. Preferably, the stops 100, of which there may preferably be at least one corresponding to each spring 5, extend radially inwardly from first centrifugal mass 1 and, in conjunction with the circumferential movement of springs 5 provided by circumferential movement of fingers 21 of hub 20, preferably serve to provide a compressive force on springs 5. As shown, stops 100 may preferably be embodied by radial extensions from first centrifugal mass 1. However, since arrangements for providing a compressive force on a spring in a torsional damping device are generally well known per se, any appropriate arrangement may essentially be used within the scope of the present invention.

Figure 3:
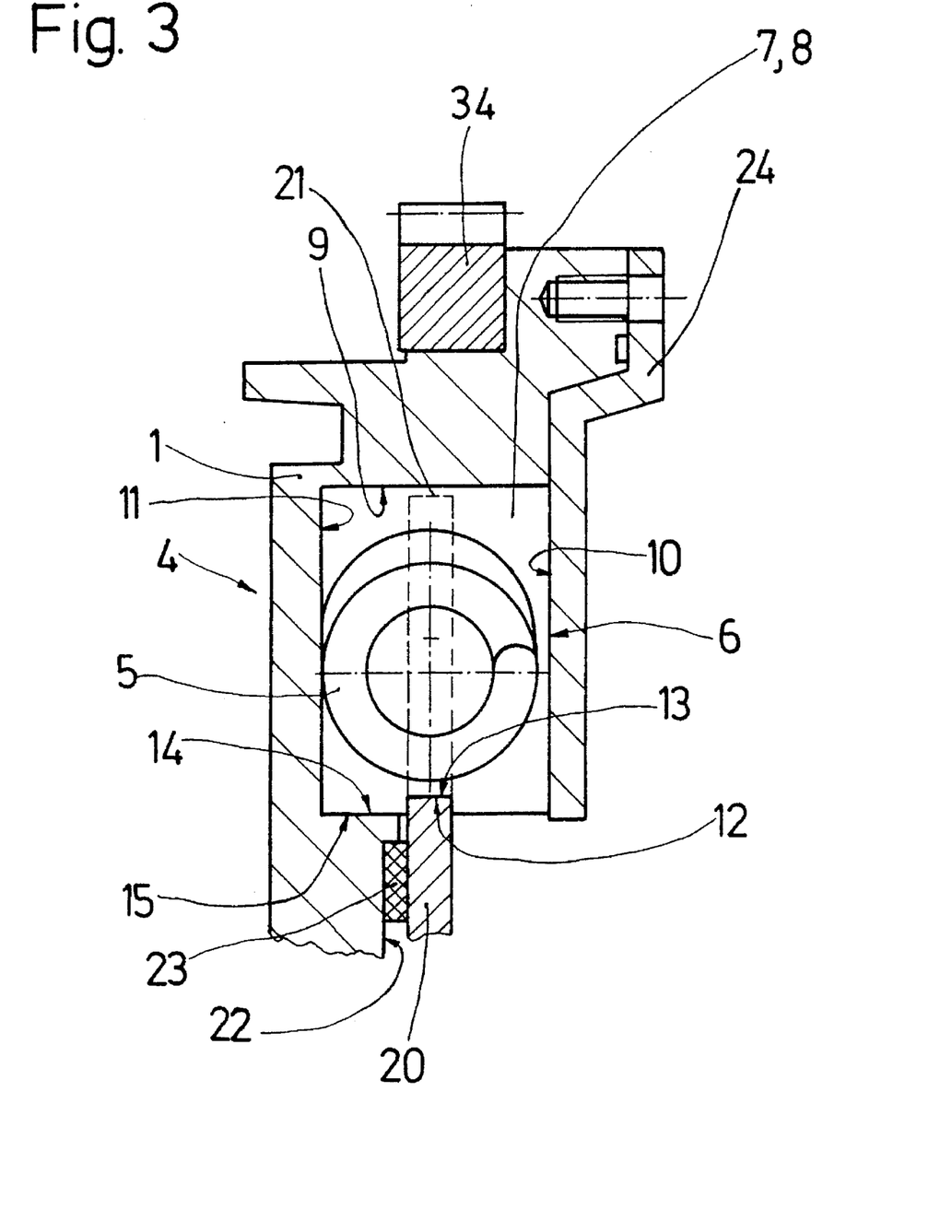
FIG. 3 shows a detail of a variant of the device illustrated in FIG. 1.

FIG. 3 illustrates a variant of the device illustrated in FIG. 1. The difference from FIG. 1 is that the external contour 13 of the hub 20 has a larger diameter than the inner contour 15 of the spring cups 7 and the guide shoes 8. As such, preferably, a circular groove is effectively formed in the spring cups 7 and the guide shoes 8. With such a circular groove, the internal contour 12 essentially serves to guide hub 20 in conjunction with the external contour 13 of hub 20. Additionally, the formed circular groove essentially serves to provide an axial fixing of the hub 20, which would consequently result in an axial fixing of the second centrifugal mass 2, such an axial fixing being guaranteed in both axial directions. As shown in FIG. 3, the circular groove can thereby be configured so that it only forms an axial guide in the direction toward the second centrifugal mass 2, while in the direction toward the first centrifugal mass 1, the axial guidance can preferably be provided by means of the above-mentioned inside wall 22 and the wearing ring 23. The other components and the corresponding reference numbers have already been explained in detail in the descriptions relating to FIGS. 1 and 2.

One feature of the invention resides broadly in the device to damp vibrations in a motor vehicle between the engine and the drive train, comprising a first centrifugal mass fastened to the crankshaft, a second centrifugal mass equipped with a start-up and shifting clutch which is mounted so that it can rotate coaxially with the first centrifugal mass—with a common axis of rotation—, a torsion damping device between the two centrifugal masses which consists at least of a first spring stage with a large angle of rotation, whereby the corresponding coil springs are guided on a common mean diameter in a channel of the first centrifugal mass which can be filled at least partly with a viscous medium, e.g. a lubricant, and which are actuated by means of spring cups, characterized by the fact that the spring stage with a large angle of rotation consists of several individual cylindrical coil springs 5 which are connected in series, whereby between the facing ends there are guide shoes 8 which are guided radially outward and in both axial directions by the inside walls 9, 10, 11 of the channel 6, and radially inside the coil springs 5 form a circumferential internal contour 12 located concentric to the axis of rotation 3, by means of which a friction bearing is provided for the second centrifugal mass 2 so that it can rotate in the radial direction by means of a corresponding external contour 13.

Another feature of the invention resides broadly in the device, characterized by the fact that the guide shoes 8 for the ends of the coil springs 5 have buffer blocks 16 which are essentially in the shape of flat, circular rings which run approximately perpendicular to the axis of the spring, and whereby on the guide shoes 8 in the radially inner area of the buffer blocks 16, in both circumferential directions there are spring guide extensions 18, which radially inwardly form the internal contour 12.

Still another feature of the invention resides broadly in the device, whereby each spring set connected in series has two end springs at some distance from one another which can be activated both by the first centrifugal mass and also by the second centrifugal mass, or by a component connected to the latter, characterized by the fact that each end spring 5 with its end pointing away from the guide shoe 8 is in contact with an essentially ring-shaped, flat buffer block 17 of a spring cup, and spring guide extensions 19 extend from the buffer block 17 radially inward and outward toward the spring, and on the one hand guide the spring and on the other hand are guided in the inner wall 9 of the channel 6, and whose internal contour 12 is identical to the internal contour of the guide shoe 8.

Yet another feature of the invention resides broadly in the device, characterized by the fact that the external contour 13 of the second centrifugal mass 2 extends at least circumferentially between the actuator elements fingers 21 for the spring cups 7.

Still yet another feature of the invention resides broadly in the device, characterized by the fact that the external contour 13 and the actuator elements fingers 21 are formed by a disc-shaped component hub 20, which runs concentric to the axis of rotation 3, and whose actuator elements fingers 21 extend between the axial walls 10, 11 of the channel 6, and which is rigidly connected in the vicinity of its inside diameter to the second centrifugal mass 2.

Yet still another feature of the invention resides broadly in the device, characterized by the fact that the external contour 13 and the internal contour 12 have a guide width which corresponds to the thickness of the disc-shaped component hub 20.

Another feature of the invention resides broadly in the device, characterized by the fact that the internal contour 12 and the external contour 13 have a larger diameter than the other areas of the spring guide extensions 18, 19, so that a groove is formed in which the disc-shaped component hub 20 is guided radially and axially.

Yet another feature of the invention resides broadly in the device, characterized by the fact that the internal contour 12, 15 essentially extends over the entire axial extent of guide shoe 8 or spring cup 7, and the disc-shaped component hub 20 is axially braced directly against the components 22, 24 of the first centrifugal mass 1.

Still another feature of the invention resides broadly in the device, characterized by the fact that the axial support in the direction of the crankshaft is provided radially inside the external contour 13 on a radial inside wall 22 of the first centrifugal mass 1 which—pointing away from the crankshaft—is axially directly opposite the disc-shaped component hub 20.

Yet still another feature of the invention resides broadly in the device, characterized by the fact that a wearing ring 23 is located between the inside wall 22 and the disc-shaped component hub 20.

Still yet another feature of the invention resides broadly in the device, whereby between the component of the first centrifugal mass which forms the inside wall of the channel closer to the second centrifugal mass and the disc-shaped component there is a seal system which comprises a spring which acts in the axial direction, characterized by the fact that the axial localization toward the first centrifugal mass 1 is performed by the spring plate 26.

Yet another feature of the invention resides broadly in the device, characterized by the fact that on the disc-shaped component hub 20—at least on the circumference between the actuator elements fingers 21—extending axially over the thickness of the material, there are concentric guide tabs 27 which form the external contour 13 opposite the likewise-expanded internal contour 12 of the guide shoes 8 and spring cups 7.

Still another feature of the invention resides broadly in the device, characterized by the fact that the guide tabs 27 are located on alternate sides—when there are an even number of actuator elements fingers 21.

Another feature of the invention resides broadly in the device, characterized by the fact that the guide tabs 27 are preferably located on the side facing the second centrifugal mass 2.

Yet still another feature of the invention resides broadly in the device, characterized by the fact that the guide tabs 27 are axially secured with one end surface 28 opposite the inside wall 10 of the cover plate 24.

Still another feature of the invention resides broadly in the device, characterized by the fact that on the first centrifugal mass 1 there is a concentric, circular guide ring surface 14 which is radially inwardly adjacent to the channel 6 and guides the guide shoes 8 and spring cups 7 radially inwardly, and extends essentially to the disc-shaped component hub 20.

Yet another feature of the invention resides broadly in the device, characterized by the fact that radially inside the seal system 25, the disc-shaped component hub 20 is connected to the second centrifugal mass 2 by means of rivets 29.

Still yet another feature of the invention resides broadly in the device, characterized by the fact that the disc-shaped component hub 20 is engaged radially inside the rivets 29 with lugs 30 in the friction disk 31 with corresponding recesses 32, which is guided concentric to the axis of rotation 3 on the first centrifugal mass 1, and is in frictional contact with the latter by means of a spring 33.

Several components of clutches and associated torsional vibration dampers, which may be utilized in accordance with the embodiments of the present invention, may be found in the following U.S. Patents: U.S. Pat. No. 5,016,744, which issued to Fischer et al. on May 21, 1991; U.S. Pat. No. 4,433,771, which issued to Caray on Feb. 28, 1984; U.S. Pat. No. 4,684,007, which issued to Maucher on Aug. 4, 1987; U.S. Pat. No. 4,697,682, which issued to Alas et al. on Oct. 6, 1987; U.S. Pat. No. 4,890,712, which issued to Maucher et al. on Jan. 2, 1990; and U.S. Pat. No. 4,651,857, which issued to Schraut et al. on Mar. 24, 1987.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 01 311, filed on Jan. 20, 1993, having inventors Bernhard Schierling and Reinhard Feldhaus, and DE-OS P 43 01 311 and DE-PS P 43 01 311, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions, and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Torsional damping device, for being connected between a motor vehicle clutch and a motor vehicle crankshaft, said torsional damping device comprising:

first flywheel arrangement and a second flywheel arrangement;

said first flywheel arrangement and said second flywheel arrangement having means for being mounted for movement with respect to one another about a common axis of rotation;

said first flywheel arrangement having means for being connected to the crankshaft and said second flywheel arrangement having means for being connected to the motor vehicle clutch;

said first flywheel arrangement and said second flywheel arrangement defining a circumferential direction about the common rotational axis;

means for transmitting torque between said first flywheel arrangement and said second flywheel arrangement;

means for damping torsional vibrations of said first flywheel arrangement and said second flywheel arrangement with respect to one another; and said damping means comprising:

spring means for damping the torsional vibrations of said first flywheel arrangement and said second flywheel arrangement with respect to one another;

means for connecting said spring means with said first flywheel arrangement;

means for connecting said spring means with said second flywheel arrangement;

said spring means comprising at least one set of a plurality of springs;

each said at least one set of a plurality of springs extending over a substantial circumferential extent about the common axis of rotation;

means for connecting neighboring pairs of springs within said at least one set of a plurality of springs;

within said at least one set of a plurality of springs, said springs being connected in series with one another, one after the other, in the circumferential direction of said first flywheel arrangement and said second flywheel arrangement;

each of said springs having a first end and a second end, said second end being disposed remotely from said first end; and each said connecting means comprising means for accommodating a second end of one of said springs and a first end of a neighboring one of said springs;

means for mounting said connecting means being independently displaceable both with respect to said first flywheel arrangement and with respect to said second flywheel arrangement;

each said connecting means comprising a guide member for connecting the corresponding neighboring pair of springs;

said first flywheel arrangement and said second flywheel arrangement forming a channel for accommodating said guide member and said plurality of springs;

each said guide member being slidably disposed within said channel;

said damping means further comprising slide bearing means for slidingly supporting a portion of said first flywheel arrangement and a portion of said second flywheel arrangement with respect to one another to permit rotation of said first flywheel arrangement and said second flywheel arrangement with respect to one another and for further damping the torsional vibrations of said first flywheel arrangement and said second flywheel arrangement with respect to one another; and said connecting means comprising said slide bearing means.

2. The device according to claim 1, wherein:

each said guide member comprises an upper surface portion and a lower surface portion, said upper surface portion for being disposed radially away from the common axis of rotation and said lower surface portion for being disposed radially towards the common axis of rotation;

said second flywheel arrangement comprises an outwardly disposed surface portion for at least partly supporting said lower surface portion of each said guide member, said outwardly disposed surface portion and said lower surface portion being slidingly engaged with one another; and said slide bearing means is at least partly formed by the sliding engagement of said lower surface portion of each said guide member and said outwardly disposed surface portion of said second flywheel arrangement with one another.

3. The device according to claim 2, wherein:

said first flywheel arrangement comprises an inwardly disposed surface portion and two axially disposed surface portions, said inwardly disposed surface portion for facing radially towards the common axis of rotation, said axially disposed surface portions for being oriented perpendicularly with respect to the common axis of rotation; and said upper surface portion of each said guide member is slidingly engaged with said inwardly disposed surface portion of said first flywheel arrangement.

4. The device according to claim 3, wherein:

each said guide member comprises a first recessed portion, for accommodating the second end of one spring; and each said guide member comprises a second recessed portion, for accommodating the first end of another, neighboring spring.

5. The device according to claim 4, further comprising:

each of said at least one set of springs comprising a first terminal spring and a second terminal spring;

first means for supporting said first terminal spring and second means for supporting said second terminal spring;

each of said first terminal spring and said second terminal spring comprising two opposite ends;

each of said first means and said second means comprising cup means, each of said cup means comprising a recessed portion for accommodating one of said ends of the corresponding one of said first terminal spring and said second terminal spring;

said cup means of said first means and said cup means of said second means being configured for actuating the corresponding set of at least one spring;

said channel having a generally rectangular cross-section and being formed mostly by said outwardly disposed surface portion of said second flywheel arrangement and said inwardly disposed surface portion and said axially disposed surface portions of said first flywheel arrangement;

said recessed portions of each said guide member comprising a flat support surface;

said flat support surface being generally circular and being configured for supporting the corresponding end of the corresponding spring;

each said spring having a central axis;

each said spring being oriented essentially straight, in a direction parallel to its central axis;

each said flat support surface being oriented generally perpendicular to the central axis of the corresponding spring;

each said guide member comprising a buffer block;

said first portion of each said guide member comprising a first spring guide extension extending from said buffer block;

said second portion of each said guide member comprising a second spring guide extension extending from said buffer block;

said buffer block having two of said flat support surfaces disposed thereupon, said two flat support surfaces facing away from each other;

said spring guide extensions running along the circumferential direction of said first flywheel arrangement and said second flywheel arrangement;

said recessed portions of each said guide member being at least partly formed by said spring guide extensions and said buffer block;

said spring guide extensions for being disposed radially inwardly of said springs, towards the common axis of rotation;

said spring guide extensions having said lower surface portion of each said guide member;

said plurality of springs comprises a plurality of generally cylindrical coil springs;

said channel for being at least partly filled with a viscous material;

said outwardly disposed surface portion of said second flywheel arrangement and said inwardly disposed surface portion of said first flywheel arrangement both for being concentric with respect to the common axis of rotation;

said at least one set of springs being three sets of springs;

each of said three sets of springs consists of three springs, wherein two of said three springs are said first and second terminal springs;

said spring means comprising a spring stage with a large angle of rotational displacement;

each of said plurality of springs within each said at least one set of springs defining a common mean radius with respect to the common axis of rotation;

said cup means comprising a first cup, corresponding to said first means, and a second cup, corresponding to said second means;

each of said first cup and said second cup comprising a buffer block add two spring guide extensions extending from said buffer block;

said spring guide extensions of said cups running along the circumferential direction of said first flywheel arrangement and said second flywheel arrangement;

one spring guide extension of each said cup being slidingly engaged with said outwardly disposed surface portion of said second flywheel arrangement and having an inwardly facing contour similar to that of said first and second spring guide extensions of said guide member means;

the other spring guide extension of each said cup being slidingly engaged with said inwardly disposed surface portion of said first flywheel arrangement;

said spring guide extensions and said buffer blocks of said cups combining to form said recessed portion;

each said guide member further comprising third and fourth spring guide extensions;

said third and fourth spring guide extensions for being disposed radially outwardly of said springs, away from the common axis of rotation;

said third and fourth spring guide extensions having said upper surface portion of each said guide member;

said second flywheel arrangement comprising a hub and a plurality of fingers extending radially outwardly from said hub;

each of said plurality of fingers comprising a pair of recessed portions for accommodating a corresponding one of said cups;

each of said fingers being configured for displacing in the circumferential direction to actuate said cups to actuate said springs;

said outwardly disposed surface of said second flywheel arrangement being disposed on said hub and extending, in the circumferential direction, at least between pairs of said fingers;

said hub for being disposed concentric to the common axis of rotation;

said fingers extending axially between said axially disposed surface portions of said first flywheel arrangement;

said hub having an inner diameter portion for being disposed towards the common axis of rotation;

said second flywheel arrangement further comprising a centrifugal mass;

said centrifugal mass and said hub being rigidly connected to one another in the vicinity of said inner diameter portion of said hub;

each said guide member and each of said cups extending axially between said axially disposed surface portions of said first flywheel arrangement;

said first flywheel arrangement further comprising flange means, said flange means extending outwardly from a radially inward portion of one of said axially disposed surface portions, in an axial direction;

said flange means having an outwardly disposed surface portion which is flush with said outwardly disposed surface portion of said second flywheel arrangement;

said lower surface portion of each said guide member being engaged with both said outwardly disposed surface portion of said flange means and said outwardly disposed surface portion of said second flywheel arrangement, across substantially the entire axial extent between said axially disposed surface portions;

said first flywheel arrangement comprising a centrifugal mass and a cover plate rigidly connected to said centrifugal mass;

said centrifugal mass of said first flywheel arrangement being a first centrifugal mass and said centrifugal mass of said second flywheel arrangement being a second centrifugal mass;

said flange means extending from said first centrifugal mass;

said inwardly disposed surface portion and one of said axially disposed surface portions being formed in said first centrifugal mass;

the other of said axially disposed surface portions being formed on said cover plate;

said hub being axially braced directly against, and being disposed axially between, said flange means and said cover plate;

said first centrifugal mass comprises an additional axially disposed surface for providing support of said first flywheel arrangement and said second flywheel arrangement with respect to each other, said additionally axially disposed surface being disposed radially inwardly of said flange means;

said device further comprising a wearing ring disposed directly between said additional axially disposed surface and said hub;

said device comprising a sealing system for sealing between said first and second flywheel arrangement;

said second centrifugal mass further comprising a spring plate;

said sealing system comprising said spring plate;

said spring plate being configured for providing a force on said cover plate to bias said additional axially disposed surface towards said second centrifugal mass;

said second centrifugal mass comprising a plurality of guide tabs extending between said first centrifugal mass and said cover plate;

said guide tabs collectively having said outwardly disposed surface portion of said second flywheel arrangement;

each of said guide tabs being disposed directly radially inwardly of said guide member;

said guide tabs each extending from said flange means to said cover plate;

each of said guide tabs having an end surface being disposed directly against said cover plate to axially secure said guide tabs;

said device further comprises rivet means for rigidly connecting said hub with said second centrifugal mass;

said rivet means being disposed radially inwardly of said spring plate;

said first flywheel arrangement further comprising a friction disc disposed in a radially inward area of said first flywheel arrangement, said friction disk for being disposed concentrically with respect to the common axis of rotation;

said hub comprising a plurality of lugs extending radially inwardly from said inner diameter portion of said hub, said inner diameter portion of said hub being disposed radially inwardly of said rivet means;

said friction disk comprising a plurality of recesses;

each of said lugs extending into a corresponding one of said recesses; and said first flywheel arrangement further comprising additional spring means for biasing said friction disk axially towards said first centrifugal mass to engage said fraction disk in frictional contact with said first centrifugal mass.

6. The device according to claim 4, further comprising:

each of said at least one set of springs comprising a first terminal spring and a second terminal spring;

first means for supporting said first terminal spring and second means for supporting said second terminal spring;

each of said first terminal spring and said second terminal spring comprising two opposite ends;

each of said first means and said second means comprising cup means, each of said cup means comprising a recessed portion for accommodating one of said ends of the corresponding one of said first terminal spring and said second terminal spring;

said cup means of said first means and said cup means of said second means being configured for actuating the corresponding set of at least one spring;

said channel having a generally rectangular cross-section and being formed mostly by said outwardly disposed surface portion of said second flywheel arrangement and said inwardly disposed surface portion and said axially disposed surface portions of said first flywheel arrangement;

said recessed portions of each said guide member comprising a flat support surface;

said flat support surface being generally circular and being configured for supporting the corresponding end of the corresponding spring;

each said spring having a central axis;

each said spring being oriented essentially straight, in a direction parallel to its central axis;

each said flat support surface being oriented generally perpendicular to the central axis of the corresponding spring;

each said guide member comprising a buffer block;

said first portion of each said guide member comprising a first spring guide extension extending from said buffer block;

said second portion of each said guide member comprising a second spring guide extension extending from said buffer block;

said buffer block having two of said flat support surfaces disposed thereupon, said two flat support surfaces facing away from each other;

said spring guide extensions running along the circumferential direction of said first flywheel arrangement and said second flywheel arrangement;

said recessed portions of each said guide member being at least partly formed by said spring guide extensions and said buffer block;

said spring guide extensions for being disposed radially inwardly of said springs, towards the common axis of rotation;

said spring guide extensions having said lower surface portion of each said guide member;

said plurality of springs comprises a plurality of generally cylindrical coil springs;

said channel for being at least partly filled with a viscous material;

said outwardly disposed surface portion of said second flywheel arrangement and said inwardly disposed surface portion of said first flywheel arrangement both for being concentric with respect to the common axis of rotation;

said at least one set of springs being three sets of springs;

each of said three sets of springs consists of three springs, wherein two of said three springs are said first and second terminal springs;

said spring means comprising a spring stage with a large angle of rotational displacement;

each of said plurality of springs within each said at least one set of springs defining a common mean radius with respect to the common axis of rotation;

said cup means comprising a first cup, corresponding to said first means, and a second cup, corresponding to said second means;

each of said first cup and said second cup comprising a buffer block and two spring guide extensions extending from said buffer block;

said spring guide extensions of said cups running along the circumferential direction of said first flywheel arrangement and said second flywheel arrangement;

one spring guide extension of each said cup being slidingly engaged with said outwardly disposed surface portion of said second flywheel arrangement and having an inwardly facing contour similar to that of said first and second spring guide extensions of said guide member;

the other spring guide extension of each said cup being slidingly engaged with said inwardly disposed surface portion of said first flywheel arrangement;

said spring guide extensions and said buffer blocks of said cups combining to form said recessed portion;

each said guide member further comprising third and fourth spring guide extensions;

said third and fourth spring guide extensions for being disposed radially outwardly of said springs, away from the common axis of rotation;

said third and fourth spring guide extensions having said upper surface portion of each said guide member;

said second flywheel arrangement comprising a hub and a plurality of fingers extending radially outwardly from said hub;

each of said plurality of fingers comprising a pair of recessed portions for accommodating a corresponding one of said cups;

each of said fingers being configured for displacing in the circumferential direction to actuate said cups to actuate said springs;

said outwardly disposed surface of said second flywheel arrangement being disposed on said hub and extending, in the circumferential direction, at least between pairs of said fingers;

said hub for being disposed concentric to the common axis of rotation;

said fingers extending axially between said axially disposed surface portions of said first flywheel arrangement;

said hub having an inner diameter portion for being disposed towards the common axis of rotation;

said second flywheel arrangement further comprising a centrifugal mass;

said centrifugal mass and said hub being rigidly connected to one another in the vicinity of said inner diameter portion of said hub;

said hub having an axial width;

said outwardly disposed surface portion of said second flywheel arrangement having an axial width essentially the same as the axial width of said hub;

each said guide member having a circumferential groove for accommodating said outwardly disposed surface portion of said second flywheel arrangement and for guiding said hub axially and radially;

said device further comprises rivet means for rigidly connecting said hub with said second centrifugal mass;

said rivet means being disposed radially inwardly of said spring plate;

said first flywheel arrangement further comprising a friction disc disposed in a radially inward area of said first flywheel arrangement, said friction disk for being disposed concentrically with respect to the common axis of rotation;

said hub comprising a plurality of lugs extending radially inwardly from said inner diameter portion of said hub, said inner diameter portion of said hub being disposed radially inwardly of said rivet means;

said friction disk comprising a plurality of recesses;

each of said lugs extending into a corresponding one of said recesses; and said first flywheel arrangement further comprising additional spring means for biasing said friction disk axially towards said first centrifugal mass to engage said friction disk in frictional contact with said first centrifugal mass.

7. Torsional damping device, for being connected between a motor vehicle clutch and a motor vehicle crankshaft, said torsional damping device comprising:

a first flywheel arrangement and a second flywheel arrangement;

said first flywheel arrangement and said second flywheel arrangement having means for being mounted for movement with respect to one another about a common axis of rotation;

said first flywheel arrangement, having means for being connected to the crankshaft and said second flywheel arrangement having means for being connected to the motor vehicle clutch;

said first flywheel arrangement and said second flywheel arrangement defining a circumferential direction about the common rotational axis;

means for transmitting torque between said first flywheel arrangement and said second flywheel arrangement;

means for damping torsional vibrations of said first flywheel arrangement and said second flywheel arrangement with respect to one another;

said damping means comprising spring means for damping the torsional vibrations of said first flywheel arrangement and said second flywheel arrangement with respect to one another;

said damping means further comprising slide bearing means for slidingly supporting a portion of said first flywheel arrangement and a portion of said second flywheel arrangement with respect to one another to permit rotation of said first flywheel arrangement and said second flywheel arrangement with respect to one another and for further, damping the torsional vibrations of said first flywheel arrangement and said second flywheel arrangement with respect to one another;

said slide bearing means comprising means for providing sliding frictional engagement between said portion of said second flywheel arrangement and said portion of said first flywheel arrangement;

said slide bearing means comprising at least one element extending between said portion of said first flywheel arrangement and said portion of said second flywheel arrangement;

means for slidably mounting said at least one element with respect to said first flywheel arrangement and said second flywheel arrangements so as to render said at least one element independently displaceable both with respect to said first flywheel arrangement and with respect to said second flywheel arrangement; and said spring means comprising at least one set of a plurality of springs;

said at least one element of said slide bearing means being disposed adjacent said plurality of springs;

said slide bearing means being disposed substantially directly adjacent said plurality of springs of said at least one set of springs;

means for connecting neighboring pairs of springs within said at least one set of a plurality of springs;

within said at least one set of a plurality of springs said springs being connected in series with one another, one after the other, in the circumferential direction of said first flywheel arrangement and said second flywheel arrangement;

each of said springs having a first end and a second end, said second end being disposed remotely from said first end;

each said connecting means comprising means for accommodating a second end of one of said springs and a first end of a neighboring one of said springs;

each said connecting means comprising a guide member for connecting the corresponding neighboring pair of springs;

said first flywheel arrangement and said second flywheel arrangement forming a channel for accommodating said guide member and said plurality of springs;

each said guide member being slidably disposed within said channel; and said at least one element of said slide bearing means comprising said connecting means.

8. The device according to claim 7, wherein:

each said guide member comprises an upper surface portion and a lower surface portion, said upper surface portion for being disposed radially away from the common axis of rotation and said lower surface portion for being disposed radially towards the common axis of rotation;

said second flywheel arrangement comprises an outwardly disposed surface portion for at least pertly supporting said lower surface portion of each said guide member, said outwardly disposed surface portion and said lower surface portion being slidingly engaged with one another; and said slide bearing means is at least partly formed by the sliding engagement of said lower surface portion of each said guide member and said outwardly disposed surface portion of said second flywheel arrangement with one another.

9. The device according to claim 8, wherein:

said first flywheel arrangement comprises an inwardly disposed surface portion and two axially disposed surface portions, said inwardly disposed surface portion for facing radially towards the common axis of rotation, said axially disposed surface portions for being oriented perpendicularly with respect to the common axis of rotation; and said upper surface portion of each said guide member is slidingly engaged with said inwardly disposed surface portion of said first flywheel arrangement.

10. The device according to claim 9, wherein:

each said guide member comprises a first recessed portion, for accommodating the second end of one spring; and each said guide member comprises a second recessed portion, for accommodating the first end of another, neighboring spring.

11. The device according to claim 10, further comprising:

each of said at least one set of springs comprising a first terminal spring and a second terminal spring;

first means for supporting said first terminal spring and second means for supporting said second terminal spring;

each of said first terminal spring and said second terminal spring comprising two opposite ends;

each of said first means and said second means comprising cup means, each of said cup means comprising a recessed portion for accommodating one of said ends of the corresponding one of said first terminal spring and said second terminal spring;

said cup means of said first means and said cup means of said second means being configured for actuating the corresponding set of at least one spring;

said channel having a generally rectangular cross-section and being formed mostly by said outwardly disposed surface portion of said second flywheel arrangement and said inwardly disposed surface portion and said axially disposed surface portions of said first flywheel arrangement;

said recessed portions of each said guide member comprising a flat support surface;

said flat support surface being generally circular and being configured for supporting the corresponding end of the corresponding spring;

each said spring having a central axis;

each said spring being oriented essentially straight, in a direction parallel to its central axis;

each said flat support surface being oriented generally perpendicular to the central axis of the corresponding spring;

each said guide member comprising a buffer block;

said first portion of each said guide member comprising a first spring guide extension extending from said buffer block;

said second portion of each said guide member comprising a second spring guide extension extending from said buffer block;

said buffer block having two of said flat support surfaces disposed thereupon, said two flat support surfaces facing away from each other;

said spring guide extensions running along the circumferential direction of said first flywheel arrangement and said second flywheel arrangement;

said recessed portions of each said guide member being at least partly formed by said spring guide extensions and said buffer block;

said spring guide extensions for being disposed radially inwardly of said springs, towards the common axis of rotation;

said spring guide extensions having said lower surface portion of each said guide member;

said plurality of springs comprises a plurality of generally cylindrical coil springs;

said channel for being at least partly filled with a viscous material;

said outwardly disposed surface portion of said second flywheel arrangement and said inwardly disposed surface portion of said first flywheel arrangement both for being concentric with respect to the common axis of rotation;

said at least one set of springs being an even number of sets of springs;

said spring means comprising a spring stage with a large angle of rotational displacement;

each of said plurality of springs within each said at least one set of springs defining a common mean radius with respect to the common axis of rotation;

said cup means comprising a first cup, corresponding to said first means, and a second cup, corresponding to said second means;

each of said first cup and said second cup comprising a buffer block and two spring guide extensions extending from said buffer block;

said spring guide extensions of said cups running along the circumferential direction of said first flywheel arrangement and said second flywheel arrangement;

one spring guide extension of each said cup being slidingly engaged with said outwardly disposed surface portion of said second flywheel arrangement and having an inwardly facing contour similar to that of said first and second spring guide extensions of said guide member;

the other spring guide extension of each said cup being slidingly engaged with said inwardly disposed surface portion of said first flywheel arrangement;

said spring guide extensions and said buffer blocks of said cup combining to form said recessed portion;

each said guide member further comprising third and fourth spring guide extensions;

said third and fourth spring guide extensions for being disposed radially outwardly of said springs, away from the common axis of rotation;

said third and fourth spring guide extensions having said upper surface portion of each said guide member;

said second flywheel arrangement comprising a hub and a plurality of fingers extending radially outwardly from said hub;

each of said plurality of fingers comprising a pair of recessed portions for accommodating a corresponding one of said cups;

each of said fingers being configured for displacing in the circumferential direction to actuate said cups to actuate said springs;

said outwardly disposed surface of said second flywheel arrangement being disposed on said hub and extending, in the circumferential direction, at least between pairs of said fingers;

said hub for being disposed concentric to the common axis of rotation;

said fingers extending axially between said axially disposed surface portions of said first flywheel arrangement;

said hub having an inner diameter portion for being disposed towards the common axis of rotation;

said second flywheel arrangement further comprising a centrifugal mass;

said centrifugal mass and said hub being rigidly connected to one another in the vicinity of said inner diameter portion of said hub;

each said guide member and each of said cups extending axially between said axially disposed surface portions of said first flywheel arrangement;

said first flywheel arrangement further comprising flange means, said flange means extending outwardly from a radially inward portion of one of said axially disposed surface portions, in an axial direction;

said flange means having an outwardly disposed surface portion which is flush with said outwardly disposed surface portion of said second flywheel arrangement;

said lower surface portion of each said guide member being engaged with both said outwardly disposed surface portion of said flange means and said outwardly disposed surface portion of said second flywheel arrangement, across substantially the entire axial extent between said axially disposed surface portions;

said first flywheel arrangement comprising a centrifugal mass and a cover plate rigidly connected to said centrifugal mass;

said centrifugal mass of said first flywheel arrangement being a first centrifugal mass and said centrifugal mass of said second flywheel arrangement being a second centrifugal mass;

said flange means extending from said first centrifugal mass;

said inwardly disposed surface portion and one of said axially disposed surface portions being formed in said first centrifugal mass;

the other of said axially disposed surface portions being formed on said cover plate;

said hub being axially braced directly against, and being disposed axially between, said flange means and said cover plate;

said first centrifugal mass comprises an additional axially disposed surface for providing support of said first flywheel arrangement and said second flywheel arrangement with respect to each other, said additional axially disposed surface being disposed radially inwardly of said flange means;

said device further comprising a wearing ring disposed directly between said additional axially disposed surface and said hub;

said device comprising a sealing system for sealing between said first and second flywheel arrangement;

said second centrifugal mass further comprising a spring plate;

said sealing system comprising said spring plate;

said spring plate being configured for providing a force on said cover plate to bias said additional axially disposed surface towards said second centrifugal mass;

said second centrifugal mass comprising a plurality of guide tabs extending between said first centrifugal mass and said cover plate;

said guide tabs collectively having said outwardly disposed surface portion of said second flywheel arrangement;

each of said guide tabs being disposed directly radially inwardly of said guide member;

said hub having an even number of fingers;

said guide tabs extending axially on successively alternating sides of said hub;

said device further comprises rivet means for rigidly connecting said hub with said second centrifugal mass;

said rivet means being disposed radially inwardly of said spring plate;

said first flywheel arrangement further comprising a friction disc disposed in a radially inward area of said first flywheel arrangement, said friction disk for being disposed concentrically with respect to the common axis of rotation;

said hub comprising a plurality of lugs extending radially inwardly from said inner diameter portion of said hub, said inner diameter portion of said hub being disposed radially inwardly of said rivet means;

said friction disk comprising a plurality of recesses;

each of said lugs extending into a corresponding one of said recesses; and said first flywheel arrangement further comprising additional spring means for biasing said friction disk axially towards said first centrifugal mass to engage said friction disk in frictional contact with said first centrifugal mass.

12. The device according to claim 10, further comprising:

each of said at least one set of springs comprising a first terminal spring and a second terminal spring;

first means for supporting said first terminal spring and second means for supporting said second terminal spring;

each of said first terminal spring and said second terminal spring comprising two opposite ends;

each of said first means and said second means comprising cup means, each of said cup means comprising a recessed portion for accommodating one of said ends of the corresponding one of said first terminal spring and said second terminal spring;

said cup means of said first means and said cup means of said second means being configured for actuating the corresponding set of at least one spring;

said channel having a generally rectangular cross-section and being formed mostly by said outwardly disposed surface portion of said second flywheel arrangement and said inwardly disposed surface portion and said axially disposed surface portions of said first flywheel arrangement;

said recessed portions of each said guide member comprising a flat support surface;

said flat support surface being generally circular and being configured for supporting the corresponding end of the corresponding spring;

each said spring having a central axis;

each said spring being oriented essentially straight, in a direction parallel to its central axis;

each said flat support surface being oriented generally perpendicular to the central axis of the corresponding spring;

each said guide member comprising a buffer block;

said first portion of each said guide member comprising a first spring guide extension extending from said buffer block;

said second portion of each said guide member comprising a second spring guide extension extending from said buffer block;

said buffer block having two of said flat support surfaces disposed thereupon, said two flat support surfaces facing away from each other;

said spring guide extensions running along the circumferential direction of said first flywheel arrangement and said second flywheel arrangement;

said recessed portions of each said guide member being at least partly formed by said spring guide extensions and said buffer block;

said spring guide extensions for being disposed radially inwardly of said springs, towards the common axis of rotation;

said spring guide extensions having said lower surface portion of each said guide member;

said plurality of springs comprises a plurality of generally cylindrical coil springs;

said channel for being at least partly filled with a viscous material;

said outwardly disposed surface portion of said second flywheel arrangement and said inwardly disposed surface portion of said first flywheel arrangement both for being concentric with respect to the common axis of rotation;

said at least one set of springs being an even number of sets of springs;

said spring means comprising a spring stage with a large angle of rotational displacement;

each of said plurality of springs within each said at least one set of springs defining a common mean radius with respect to the common axis of rotation;

said cup means comprising a first cup, corresponding to said first means, and a second cup, corresponding to said second means;

each of said first cup and said second cup comprising a buffer block and two spring guide extensions extending from said buffer block;

said spring guide extensions of said cups running along the circumferential direction of said first flywheel arrangement and said second flywheel arrangement;

one spring guide extension of each said cup being slidingly engaged with said outwardly disposed surface portion of said second flywheel arrangement and having an inwardly facing contour similar to that of said first and second spring guide extensions of said guide member;

the other spring guide extension of each said cup being slidingly engaged with said inwardly disposed surface portion of said first flywheel arrangement;

said spring guide extensions and said buffer blocks of said cups combining to form said recessed portion;

each said guide member further comprising third and fourth spring guide extensions;

said third and fourth spring guide extensions for being disposed radially outwardly of said springs, away from the common axis of rotation;

said third and fourth spring guide extensions having said upper surface portion of each said guide member;

said second flywheel arrangement comprising a hub and a plurality of fingers extending radially outwardly from said hub;

each of said plurality of fingers comprising a pair of recessed portions for accommodating a corresponding one of said cups;

each of said fingers being configured for displacing in the circumferential direction to actuate said cups to actuate said springs;

said outwardly disposed surface of said second flywheel arrangement being disposed on said hub and extending, in the circumferential direction, at least between pairs of said fingers;

said hub for being disposed concentric to the common axis of rotation;

said fingers extending axially between said axially disposed surface portions of said first flywheel arrangement;

said hub having an inner diameter portion for being disposed towards the common axis of rotation;

said second flywheel arrangement further comprising a centrifugal mass;

said centrifugal mass and said hub being rigidly connected to one another in the vicinity of said inner diameter portion of said hub;

said hub having an axial width;

said outwardly disposed surface portion of said second flywheel arrangement having an axial width essentially the same as the axial width of said hub;

each said guide member having a circumferential groove for accommodating said outwardly disposed surface portion of said second flywheel arrangement and for guiding said hub axially and radially;

said device further comprises rivet means for rigidly connecting said hub with said second centrifugal mass;

said rivet means being disposed radially inwardly of said spring plate;

said first flywheel arrangement further comprising a friction disc disposed in a radially inward area of said first flywheel arrangement, said friction disk for being disposed concentrically with respect to the common axis of rotation;

said hub comprising a plurality of lugs extending radially inwardly from said inner diameter portion of said hub, said inner diameter portion of said hub being disposed radially inwardly of said rivet means;

said friction disk comprising a plurality of recesses;

each of said lugs extending into a corresponding one of said recesses; and said first flywheel arrangement further comprising additional spring means for biasing said friction disk axially towards said first centrifugal mass to engage said friction disk in frictional contact with said first centrifugal mass.

* * * * *

UNITED STATES PATENT AND TRADEMARK OFFICE
CERTIFICATE OF CORRECTION

PATENT NO. : 5,624,317
DATED : April 29, 1997
INVENTOR(S) : Bernhard SCHIERLING and Reinhard FELDHAUS It is certified that error appears in the above-identified patent and that said Letters Patent is hereby corrected as shown below:

In column 8, line 11, after '10,', delete "li" and insert --11--.

In column 10, line 7, Claim 1, before 'first' insert --a--.

In column 14, line 60, Claim 5, before 'disk', delete "fraction" and insert --friction--.

In column 18, line 46, Claim 8, after 'least', delete "pertly" and insert --partly--.

In column 20, line 36, Claim 11, before 'combining', delete "cup" and insert --cups--.

Signed and Sealed this

Ninth Day of September, 1997

Attest:

BRUCE LEHMAN

*Attesting Officer*  *Commissioner of Patents and Trademarks*